Nov. 5, 1935.  C. E. PHILLMORE  2,019,767
MOTION PICTURE CAMERA
Filed July 13, 1933  3 Sheets-Sheet 1

Inventor
Charles E. Phillmore

Inventor
Charles E. Phillmore

Nov. 5, 1935.  C. E. PHILLMORE  2,019,767
MOTION PICTURE CAMERA
Filed July 13, 1933  3 Sheets-Sheet 3
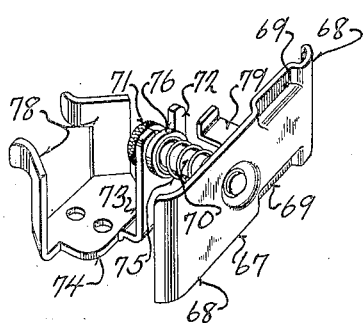
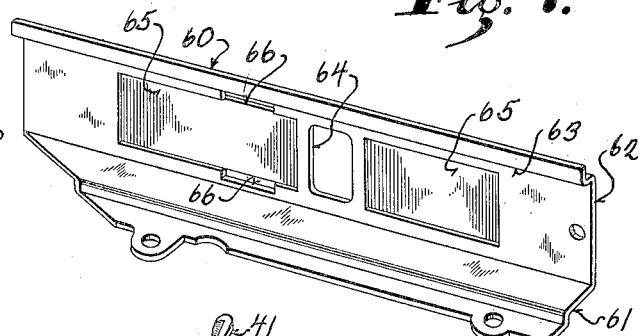
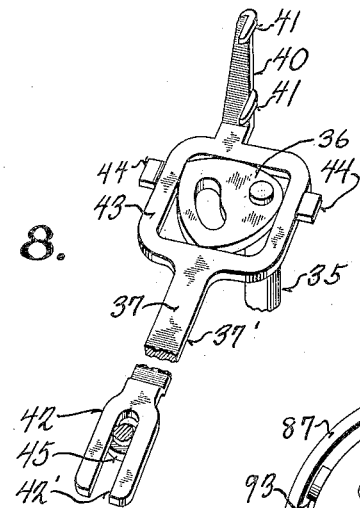
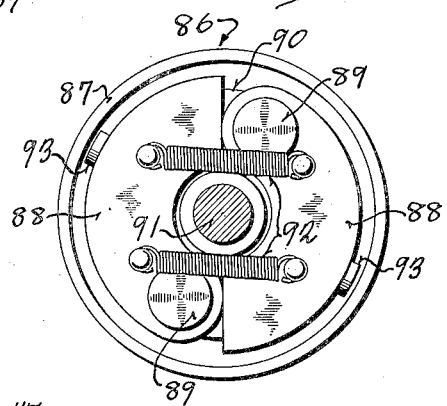
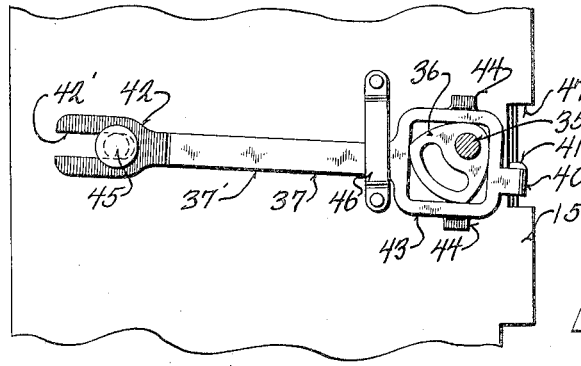
Inventor
Charles E. Phillmore
By Hamilton Jones
Attorney Patented Nov. 5, 1935

2,019,767

UNITED STATES PATENT OFFICE 2,019,767

MOTION PICTURE CAMERA

Charles E. Phillmore, Oak Park, Ill., assignor to Tobin Tool and Die Company, Fond du Lac, Wis., a corporation of Wisconsin Application July 13, 1933, Serial No. 680,212

6 Claims. (Cl. 88—17)

This invention relates to photography, and refers more particularly to motor driven motion picture cameras.

It is a general object of this invention to simplify and improve the construction of motion picture cameras.

More specifically, it is an object of this invention to provide an improved suspension and actuating means for the pull-down claw.

Another object of this invention is to provide an improved pressure plate, and means for readily removably mounting the same in position to facilitate threading the film through the camera and cleaning the film guideway.

Another object of this invention is to combine the mounting for the pressure plate and the stripper which strips the film from the sprocket, so that both these elements may be quickly removed when desired.

Another object of this invention is to provide a novel running lock, which is so constructed as to enable instant engagement and release.

Another object of this invention is to provide a camera of the character described having a totally enclosed view finder compartment.

A further object of this invention resides in the provision of a novel governor structure for controlling the speed of operation of the mechanism.

And a still further object of this invention resides in the provision of a simple device for readily removably securing the cover of the camera case in position.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, I have illustrated one complete example of the physical embodiment of my invention constructed according to the best mode I have so far devised for the practical application of the principles thereof, and in which:

Figure 6 is a perspective view of the film stripper and pressure plate shown detached from the rest of the mechanism;

Figure 7 is a perspective view of the film guide plate;

Figure 8 is a perspective view of the pull-down claw and its actuating cam;

Figure 9 is a view in elevation of the pull-down claw and its driving cam to show specifically the manner of its suspension; and Figure 10 is a detail view in elevation of the governor.

Figure 1:
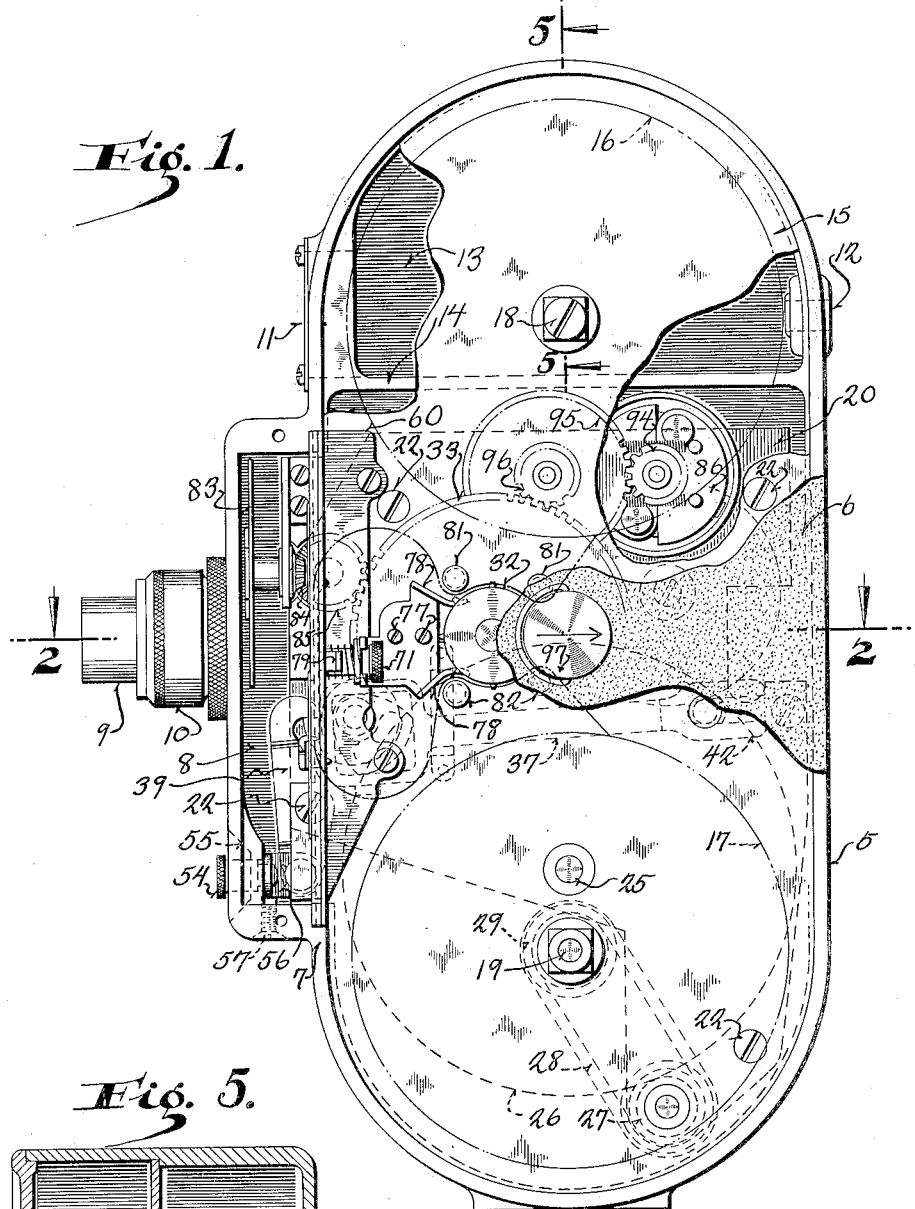
Figure 1 is a side view of a camera embodying this invention with the major portion of the cover broken away and with other parts broken away to illustrate structural details.
Figure 5:
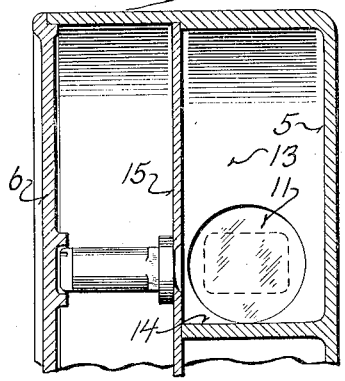
Figure 5 is a detail section view through Figure 1 on the plane of the line 5—5, showing the location of the view finder compartment.

Referring now more particularly to the accompanying drawings in which like numerals indicate like parts throughout the several views, the numeral 5 designates the outer enclosing case of a motion picture camera embodying this invention, the open side of which is closed by a removable cover 6.

One side wall 7 of the case is provided with a protrusion to define a shutter compartment 8. Mounted on the outer wall of the compartment 8 is an objective 9 in a focusing mount 10. Above the compartment 8 is a view finder lens 11, which may be viewed through a finder sight 12 on the opposite side wall of the case.

The space between the view finder lens 11 and the sight 12, forms a view finder compartment 13, which is totally enclosed by the outer walls of the case, a partition wall 14 half the height of the side walls and extending transversely across the case from one side wall to the other, and a front plate 15, which forms part of the support for the mechanism to be hereinafter more fully described.

Inasmuch as the view finder compartment is totally enclosed and no light is admitted thereto except through the finder lens and the finder sight, the effectiveness of the view finder is considerably improved.

As is customary, in motion picture cameras of this character, the film is taken from a feeder reel 16, run past the objective where it is exposed, and then wound up on take-up reel 17. Inasmuch as the construction of the reels is well known and forms no part of this invention, they have been merely indicated in construction lines, the feeder reel 16 being mounted on a spindle 18 fixed to the front plate 15 and the take-up reel 17 being mounted on a spindle 19 journalled to turn in a bearing carried by the front plate 15.

Figure 2:
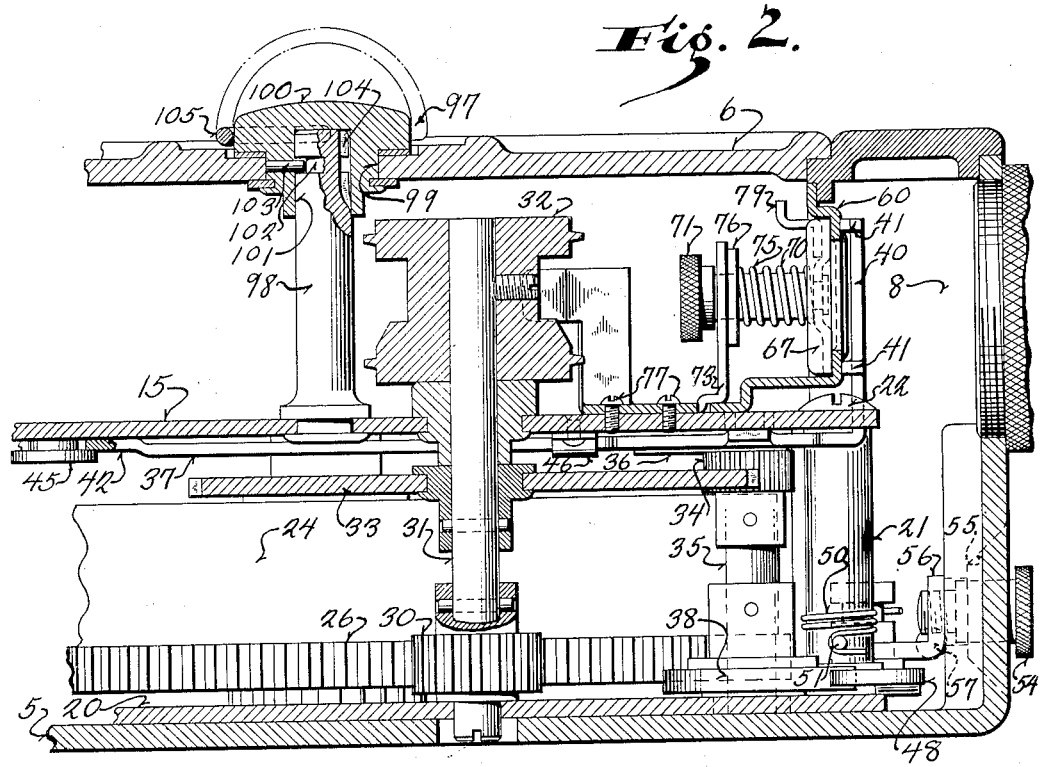
Figure 2 is a cross section view on an enlarged scale, taken through Figure 1 on the plane of the line 2—2.

The mechanism for running the film through the camera is supported from the front plate 15 and a back plate 20, suitably joined to the front plate by a plurality of posts 21, only one of which is shown, in Figure 2, and screws 22 passed through the plates and threaded into the posts.

The front plate, as clearly shown in Figure 1, is of a shape to snugly fit within the case and engage the side walls thereof throughout its entire peripheral edge, but the back plate is smaller and fits in the compartment beneath the partition wall 14. The entire mechanism assembled between the plates is readily insertable in or removable from the case to facilitate assembly of the camera during production.

The motor for driving the mechanism is of the conventional spring type and consists of a clock spring contained in a drum 24 mounted to turn on a shaft 25. Suitable means (not shown) are provided for winding up the spring motor. A driving gear 26 is carried by the drum 24 and meshing with the main driving gear 26 is a pinion 27, which through a pulley on its shaft and a belt 28 trained about a pulley 29, drives the take-up reel directly.

Also meshing with the main driving gear 26 is a pinion 30 fixed to a sprocket shaft 31 suitably journalled in the front and back plates. Secured to the outer end of the sprocket shaft 31 is a sprocket 32, which pulls the film from the feeder reel, and attached to the sprocket shaft directly beneath the front plate is a gear 33.

The gear 33 meshes with a pinion 34 fixed to a cam shaft 35 journalled in bearings carried by the front and rear plates. The cam shaft 35 carries a cam 36 for imparting an oscillatory motion to the pull-down claw 37, and also has a ratchet 38 with which a running lock latch 39 engages to control the starting and stopping of the mechanism. The cam 36 is disposed directly beneath the front plate 15, and the ratchet wheel 38 overlies the back plate 20

The pull down claw 37, as best illustrated in Figures 8 and 9, is formed from sheet metal and comprises a flat lever 37' having a right angular extension 40 at one end. Film engaging tines 41 are carried by the extension 40. The opposite end portion 42 of the lever is offset and bifurcated as at 42'.

Adjacent the right angular extension, the lever is enlarged and cut out to provide a substantially square hollow frame 43 which circumscribes the cam 36. The opposite sides of the frame 43 have offset lugs 44 which lie substantially in the plane of the offset bifurcated end portion 42 and together therewith, form feet by which the claw is slidably engaged with the undersurface of the plate 15.

As stated, the cam 36 is directly adjacent the undersurface of the plate 15 and the claw is retained in sliding contact with said face of the plate and in operative engagement with the cam by a headed stud 45 fixed to the plate and engaged in the slot 42' of the bifurcated end and by a stirrup 46 disposed across the claw adjacent the hollow frame 43.

With the claw in position, the right angular extension 40 projects to the other side of the plate through a notch 47 cut in the edge portion thereof as best shown in Figure 9.

Figure 3:
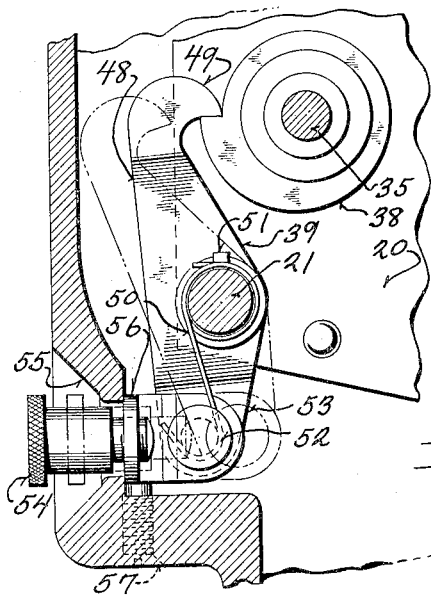
Figure 3 is a detail section view showing the specific structure of the running lock and its releasing means.
Figure 4:
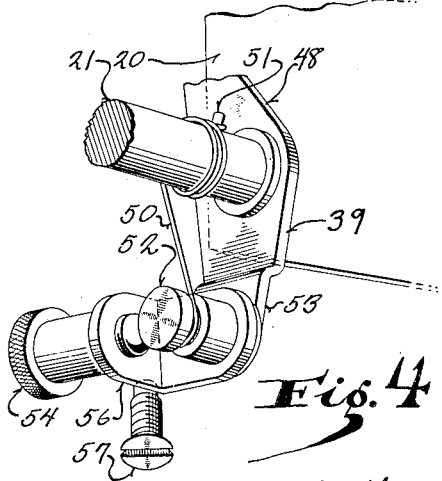
Figure 4 is a detail perspective view showing part of the running lock.

The running lock, which embodies the ratchet wheel 38 attached to the cam shaft and the latch 39, is best illustrated in Figures 3 and 4. As here shown, the ratchet wheel 38 has but one tooth and the latch 39 is in the form of a lever 48 pivotally mounted on the adjacent stud 21 with its hooked end 49 arranged to engage the tooth of the ratchet wheel.

A torsion spring 50 coiled about the stud 21 and having one end hooked to a pin 51 fixed to the stud and its other end extended and engaged with a stud 52 carried by the end 53 of the latch lever, serves to yieldably retain the latch lever in its operative position engaging its hooked end with the ratchet wheel. To enable the latch lever to be disengaged and thus permit the functioning of the mechanism, a push button 54 projecting through an aperture 55 in the adjacent wall of the case is connected with the stud 52 through a right angular link 56.

Upon depression of the push button 54, the latch lever is disengaged from the ratchet, and to enable the latch lever to be releasably secured in its inoperative position permitting the mechanism to function, a stop screw 57 is provided. The stop screw 57 is threaded in the case with its inner end disposed adjacent one flange of the right angular link 56 and so positioned that when the push button is depressed, said flange of the link may be engaged in back of the end of the screw 57 to thus releasably secure the latch lever in its inoperative position shown in dotted lines in Figure 3.

The aperture 55 in the case through which the push button 54 projects, is sufficiently large to permit the slight angular motion of the push button with the link 56 which is necessary to engage and release the link from engagement with the screw end 57. Inasmuch as the engagement between the link and the screw end is but slight, release of the latch requires but a slight tilting of the push button upwardly with respect to Figures 3 and 4, whereupon the torsion spring 51 snaps the latch lever to its operative position.

Separating the shutter compartment 8 from the interior of the case is a film guide plate 60, which, as best illustrated in Figure 7, is right angular in cross section having an attaching flange 61 and a film engaging flange 62. The flange 61 is attached by screws to the front plate 15 so as to dispose the film engaging flange 62 across the axis of the objective. The outer edge portion of the flange 62 is offset to form a guide 63 between which and the flange 61, the film is guided as it is drawn across the path of the light rays from the objective by the pull-down claw.

In line with the objective, the flange 62 has a rectangular opening 64, which frames the individual pictures taken on the film. Above and beneath the rectangular opening 64, the flange 62 is embossed to form depressions 65 to relieve the engagement between the film and the guide plate, and beneath the rectangular opening 64 and at opposite sides of the depression 65, are two elongated slots 66 through which the tines 41 of the pull down claw project to engage the film as will be readily apparent.

The film is held in its track formed by the flange 62, by a spring pressed pressure plate 67. The construction of the pressure plate is best illustrated in Figure 6. As here shown, it consists merely of a short flat plate of a width substantially equal to the width of the film and a length sufficient to cover the claw slots 66 and also the rectangular opening 64. The extreme ends of the plate are curved as at 68 to guide the film under it and that portion of the plate overlying the slots 66 is embossed to form recesses 69 to accommodate the ends of the claw tines.

Secured to a medial portion of the pressure plate is a mounting stud 70 having a head 71. Inwardly of its head, the stud is engaged in a slot 72 formed in an upstanding support 73 formed as part of a film stripper 74. A compression spring 75 coiled about the mounting stud 70 and confined between the pressure plate and a washer 76, bearing against the face of the slotted arm 73 yieldably urges the pressure plate toward the film guiding plate to hold the film in position and frictionally holds the stud assembled with the support 73.

The film stripper 74 is securely mounted to the front plate 15 by screws 77, and as best shown in Figure 1, has two fingers 78, the extremities of which lie adjacent the sprocket 32 to strip the film therefrom and guide the same back onto the sprocket as clearly illustrated.

Inasmuch as the film stripper is rigidly attached to the front plate 15, it forms a convenient support for the pressure plate and, as will be readily apparent, both these elements may be quickly detached, if desired, merely by removing the two screws 77.

It is also evident that the pressure plate itself may be quickly detached from its slotted supporting arm 73 merely by retracting the plate against the action of its spring 75 and slipping its mounting stud from the slot 72. To facilitate this detachment of the pressure plate, a finger grip or handle 79 is attached to the plate, and the head 71 on the end of the stud is knurled.

The ready detachment of the pressure plate materially facilitates cleaning of the film engaging surfaces of the guide plate and the pressure plate and also facilitates threading the film through the camera.

As indicated in construction lines in Figure 1, the film, as it is taken from the feeder reel 16, passes under two guide posts 81 and over the upper peripheral portion of the sprocket 32 to be stripped therefrom and form a loop before it passes down between the pressure plate and the guide plate across the path of the light rays entering through the objective. After it leaves the lower end of the pressure plate, a second loop carries the film back over guide posts 82 and into engagement with the sprockets 32 and then to the take-up reel 17.

As is customary, in motion picture cameras, a shutter 83 is provided. This unit is mounted in the compartment 8 and is driven through bevel gears 84 and a pinion 85 meshing with the gear 33 on the sprocket shaft. The shutter is, of course, arranged to cross the path of the light rays directed toward the film by the objective and functions in the well known manner to shut off the light during the intermittent advance of the film.

It is also customary in cameras of this nature to provide a governor to insure proper speed of operation. In the present instance, the governor, indicated generally by the numeral 86, is of simplified and improved construction, and consists of a stationary cup 87 mounted from the stationary back plate 20, and a pair of pivoted weights 88 pivotally mounted by studs 89 fixed to a disc 90 which is secured to a rotatable shaft 91. Contractile springs 92 connect the two pivoted weights and tend to hold the same in a contracted position with their outer free ends spaced from the inner peripheral wall of the brake cup.

The outer free end portions of the pivoted weights have friction blocks or pads 93 to engage the inner wall of the brake cup as the pivoted levers are swung outwardly by centrifugal force to effect the desired braking action and hold the speed of the mechanism at a predetermined value. The rotatable shaft 91 is driven through a pinion 94 fixed to the shaft and meshing with an idler gear 95, which is driven from the gear 33 by a pinion 96 fixed to the gear 95.

The cover 6 is secured in closed position by a novel lock device indicated generally by the numeral 97. This lock comprises a stud 98 anchored to the top plate 15 and projecting through an opening 99 in the cover. Freely rotatably mounted in the opening 99 is a button 100 bored as at 101 to receive the outer end of the stud 98.

The outer end of the stud has an annular groove 102 with which a pin 103 carried by the button 100 is engageable through a longitudinal slot 104 leading from the extreme outer end of the stud to the annular groove. A handle loop 105 attached to the button 100 enables the same to be readily turned to align and disalign the pin 103 with the longitudinal slot 104 and also affords convenient means for lifting the cover from its closed position after its lock has been released.

From the foregoing description taken in connection with the accompanying drawings, it will be readily apparent to those skilled in the art, that this invention provides numerous improvements in the construction of motor driven motion picture cameras, and that the design of such cameras is thereby materially simplified.

What I claim as my invention is:

1. In a motion picture apparatus, means to guide film for movement in a fixed path including a pressure plate, and means to readily detachably mount the pressure plate comprising, a fixed bifurcated support, a stud attached to the pressure plate and having its outer end portion received in the slot of said bifurcated support, and an expansive spring confined between the pressure plate and the support to frictionally retain the stud engaged with the bifurcated support and to yieldably urge the pressure plate toward the film, said plate being detachable from the bifurcated support by shifting the same longitudinally with respect to the slot of said bifurcated support.

2. In motion picture apparatus, means to guide film in a fixed path comprising, a fixed guide plate formed to define a track for the film, and a pressure plate to hold the film in said track, means to readily removably mount said pressure plate comprising, a slotted support, a headed stud fixed to the pressure plate and having its outer end portion receivable in the slot of said support, a washer on the stud adjacent the head and adapted to engage one side of the slotted support, and an expansive spring confined between said washer and the pressure plate to force the washer against the slotted support to hold the stud frictionally engaged with the support and to yieldably urge the pressure plate toward the fixed guide plate.

3. In a motion picture camera, mechanism to run film through the camera including, a sprocket with which the film engages, and guide means for the film comprising, a fixed guide plate formed to define a track for the film, and a pressure plate to hold the film in said track, a stripper to strip film from the sprocket, said stripper being in the form of a sheet metal stamping and having an integral upstanding bifurcated arm, and means to mount the pressure plate comprising a stud carried by the pressure plate and slidably and removably engaged in the slot of said upstanding bifurcated arm, and an expansive spring confined between the pressure plate and said upstanding bifurcated arm.

4. In a motion picture camera, mechanism to run film through the camera, including a sprocket with which the film engages, and guide means for the film comprising, a fixed guide plate formed to define a track for the film, and a pressure plate to hold the film in said track, a stripper to strip film from the sprocket, and means to readily detachably mount the pressure plate comprising, an upstanding slotted support formed as part of the stripper, a headed stud carried by the pressure plate and detachably engaged in the slot of said upstanding support, a washer slidable on the stud and adapted to engage the side of the support opposite the head of the stud, and an expansive spring mounted on the stud and confined between said washer and the pressure plate to yieldably urge the washer into intimate frictional engagement with the upstanding support and to yieldably urge the pressure plate toward the fixed guide plate.

5. In a motion picture apparatus, means to guide film along a fixed path including a stationary track for the film and a pressure plate to hold the film in the track, means to readily detachably mount the pressure plate comprising, an upstanding bifurcated support, a headed stud carried by the pressure plate and engageable in the bifurcation of said support, a spring coiled about said stud, a sliding washer on the stud adapted to be urged into frictional engagement with one side of the bifurcated support by said spring, said spring also providing a yielding pressure to hold the pressure plate against the film, and a finger engaging grip carried by the pressure plate to facilitate detachment of the plate from its bifurcated support.

6. In a motion picture apparatus, a combined stripper and support for a pressure plate to hold the film in its guideway, comprising a bracket stamped of sheet metal and having a flat attaching portion from which walls are bent up, stripper fingers on two of the walls, and a third wall having its outer end portion bifurcated to afford means for readily detachably mounting the pressure plate.

CHARLES E. PHILLMORE.